United States Patent
Kachare et al.

(10) Patent No.: US 10,282,094 B2
(45) Date of Patent: May 7, 2019

(54) METHOD FOR AGGREGATED NVME-OVER-FABRICS ESSD

(71) Applicant: Samsung Electronics Co., Ltd., Suwon-si, Gyeonggi-do (KR)

(72) Inventors: Ramdas P. Kachare, Cupertino, CA (US); Sompong Paul Olarig, Pleasanton, CA (US); Fred Worley, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 15/618,081

(22) Filed: Jun. 8, 2017

(65) Prior Publication Data

US 2018/0284990 A1 Oct. 4, 2018

Related U.S. Application Data

(60) Provisional application No. 62/480,113, filed on Mar. 31, 2017, provisional application No. 62/483,913, filed on Apr. 10, 2017.

(51) Int. Cl.

| | |
|---|---|
| *G06F 12/00* | (2006.01) |
| *G06F 13/00* | (2006.01) |
| *G06F 3/06* | (2006.01) |
| *G06F 13/40* | (2006.01) |
| *G06F 13/28* | (2006.01) |
| *G06F 13/42* | (2006.01) |

(52) U.S. Cl.
CPC ............ *G06F 3/0605* (2013.01); *G06F 3/067* (2013.01); *G06F 3/0631* (2013.01); *G06F 3/0632* (2013.01); *G06F 3/0659* (2013.01); *G06F 13/28* (2013.01); *G06F 13/4022* (2013.01); *G06F 13/4282* (2013.01); *G06F 2213/0026* (2013.01)

(58) Field of Classification Search
CPC ........ G06F 3/067; G06F 3/0679; G06F 3/083; G06F 3/0688; G06F 2213/0026
See application file for complete search history.

(56) References Cited

U.S. PATENT DOCUMENTS

| | | | |
|---|---|---|---|
| 9,111,598 B2 | 8/2015 | Jibbe et al. | |
| 9,189,385 B2 | 11/2015 | Cohen et al. | |
| 9,430,268 B2 | 8/2016 | Hussain et al. | |
| 9,467,512 B2 | 10/2016 | Tamir et al. | |
| 9,483,431 B2 | 11/2016 | Bergsten et al. | |
| 9,519,578 B1 | 12/2016 | Kuzmin et al. | |
| 2007/0214316 A1* | 9/2007 | Kim | G06F 3/0613 711/114 |

(Continued)

FOREIGN PATENT DOCUMENTS

WO WO 2016/196766 A2 12/2016

*Primary Examiner* — Sean D Rossiter

(74) *Attorney, Agent, or Firm* — Lewis Roca Rothgerber Christie LLP

(57) ABSTRACT

In a method of storage aggregation for NVMe Over Fabrics devices, the method includes: identifying an aggregation group as an aggregated Ethernet SSD comprising a plurality of NVMe-oF SSDs; selecting one of the NVMe-oF SSDs of the aggregation group as a primary NVMe-oF SSD; selecting others of the NVMe-oF SSDs of the aggregation group as secondary NVMe-oF SSDs; and initializing a Map Allocation Table in the primary NVMe-oF SSD with a processor for managing the NVMe-oF SSDs.

20 Claims, 9 Drawing Sheets

(56) References Cited

U.S. PATENT DOCUMENTS

| | | | |
|---|---|---|---|
| 2008/0109589 A1* | 5/2008 | Honda | G06F 3/0607 |
| | | | 711/103 |
| 2011/0208922 A1* | 8/2011 | Coronado | G06F 11/1438 |
| | | | 711/148 |
| 2013/0198312 A1* | 8/2013 | Tamir | G06F 15/167 |
| | | | 709/212 |
| 2015/0222705 A1 | 8/2015 | Stephens | |
| 2015/0254003 A1 | 9/2015 | Lee et al. | |
| 2015/0378606 A1* | 12/2015 | Huang | G06F 3/061 |
| | | | 711/103 |
| 2017/0075828 A1* | 3/2017 | Monji | G06F 13/1668 |
| 2018/0032249 A1* | 2/2018 | Makhervaks | G06F 3/061 |
| 2018/0032267 A1* | 2/2018 | Koul | G06F 3/0613 |
| 2018/0113875 A1* | 4/2018 | Jain | G06F 3/0679 |

* cited by examiner

| eSSD Index (313) | Capacity (TB) (311) | Transport Address (MAC/IP) (312) | Mapped Address NS.LBA Range (314) | Free Capacity (TB) | Other |
|---|---|---|---|---|---|
| 0 | 16 | | | | |
| 1 | 8 | | | | |
| 2 | 32 | | | | |
| 3 | 16 | | | | |

METHOD FOR AGGREGATED NVME-OVER-FABRICS ESSD

CROSS-REFERENCE TO RELATED APPLICATION(S)

This application claims priority to, and the benefit of, Provisional Application Nos. 62/480,113 and 62/483,913, respectively filed on Mar. 31, 2017 and Apr. 10, 2017 in the United States Patent and Trademark Office, the contents of which are incorporated herein in their entirety by reference.

BACKGROUND

1. Field

Some embodiments of the present disclosure relate generally to a system and method for aggregating multiple memory drives (e.g., eSSDs) to be perceived by a host as a single, large, logical capacity.

2. Description of the Related Art

Solid State Drives (SSDs) are rapidly becoming preferred storage elements of modern IT infrastructures, thereby replacing traditional Hard Disk Drives (HDDs). SSDs offer very low latency, high data read/write throughput, and reliable data storage.

NVMe-over-Fabrics (NVMe-oF) is an emerging technology that allows hundreds or thousands of NVMe-oF devices (e.g., non-volatile memory (NVMe) SSDs) to be connected over network fabrics such as IB, FC, and Ethernet. The NVMe-oF protocol enables remote Direct Attach Storage (rDAS) implementation. This allows a large number of SSDs to be connected to a remote host. The NVMe-oF protocol uses the Remote Direct Memory Access (RDMA) protocol to provide reliable communication of NVMe commands, data, and responses. Transport protocols for providing RDMA services include iWARP, RoCE v1, and RoCE v2.

The NVMe-oF interface allows a large number of SSDs to be connected to a remote host. Conventionally, for each NVMe-oF SSD, a driver instance runs on the remote host. For some applications, the storage capacity provided by a single SSD may be insufficient

SUMMARY

Some embodiments of the present disclosure provide a method of aggregating a plurality of SSDs that are perceived by a host as a single large-capacity logical volume, and a networked structure for accomplishing the method.

According to some embodiments, in a method of storage aggregation for NVMe Over Fabrics devices, the method includes: identifying an aggregation group as an aggregated Ethernet SSD comprising a plurality of NVMe-oF SSDs; selecting one of the NVMe-oF SSDs of the aggregation group as a primary NVMe-oF SSD; selecting others of the NVMe-oF SSDs of the aggregation group as secondary NVMe-oF SSDs; and initializing a Map Allocation Table in the primary NVMe-oF SSD with a processor for managing the NVMe-oF SSDs.

According to some example embodiments, initializing the Map Allocation Table with the processor occurs under guidance of a storage administrator connected to the aggregation group.

According to some example embodiments, the Map Allocation Table comprises, for each of the NVMe-oF SSDs of the aggregation group, a capacity of the NVMe-oF SSD, an address of the NVMe-oF SSD, and a remaining amount of capacity of the NVMe-oF SSD.

According to some example embodiments, the method further includes providing the address of the primary NVMe-oF SSD to user applications to enable data transfer between the aggregation group and the user applications.

According to some example embodiments, the method further includes: receiving an Admin command at the primary NVMe-oF SSD from a host connected to the aggregation group; determining whether data corresponding to the Admin command is stored on only the primary NVMe-oF SSD or on one or more of the secondary NVMe-oF SSDs; when the data is stored on the one or more of the secondary NVMe-oF SSDs, segmenting the Admin command into one or more Admin sub-commands respectively corresponding to the one or more of the secondary NVMe-oF SSDs; transferring the data to the host; receiving sub-command completion entries from the one or more of the secondary NVMe-oF SSDs; and creating and sending a completion entry from the primary NVMe-oF SSD to the host.

According to some example embodiments, the method further includes: receiving an Admin sub-command of the one or more Admin sub-commands at a corresponding secondary NVMe-oF SSD of the one or more of the secondary NVMe-oF SSDs; determining whether to transfer the data from the corresponding secondary NVMe-oF SSD to the primary NVMe-oF SSD in accordance with the Admin sub-command; creating a completion entry; and sending the completion entry to the primary NVMe-oF SSD.

According to some example embodiments, the method further includes: receiving a command to create a Namespace or a command to delete a Namespace at the primary NVMe-oF SSD; referencing the Map Allocation Table with the primary NVMe-oF SSD; allocating capacity in the primary NVMe-oF SSD and/or in one or more of the secondary NVMe-oF SSDs when the command is to create the Namespace, or retrieving a corresponding one of the primary NVMe-oF SSD and/or the one or more of the secondary NVMe-oF SSDs wen the command is to delete the Namespace; and updating the Map Allocation Table.

According to some example embodiments, the method further includes: receiving a Read/Write command at the primary NVMe-oF SSD; looking up the Map Allocation Table with the primary NVMe-oF SSD; creating one or more Read/Write sub-commands; sending the one or more Read/Write sub-commands to one or more of the secondary NVMe-oF SSDs, respectively; transferring data between a host and the primary NVMe-oF SSD and/or the one or more of the secondary NVMe-oF SSDs in accordance with the Read/Write command; and sending a completion to the host following transfer of the data.

According to some example embodiments, the method further includes: receiving a Read/Write sub-command of the one or more Read/Write sub-commands at a corresponding secondary NVMe-oF SSD of the one or more secondary NVMe-oF SSDs; extracting transport information corresponding to the Read/Write sub-command; issuing a Read/Write request from the corresponding secondary NVMe-oF SSD to the host; and sending a completion entry to the primary NVMe-oF SSD following completion of a data transfer corresponding to the Read/Write sub-command.

According to some embodiments, in a method of NVMe-oF SSD capacity aggregation in a group of NVMe-oF Ethernet SSDs, the method includes: identifying a plurality of NVMe-oF SSDs of an aggregation group; assigning one of the NVMe-oF SSDs as a primary NVMe-oF SSD; and assigning remaining ones of the NVMe-oF SSDs as secondary NVMe-oF SSDs, wherein the only NVMe-oF SSD that is visible to a host driver of a host is the primary NVMe-oF SSD.

According to some example embodiments, the method further includes maintaining a Map Allocation Table with the primary NVMe-oF SSD in accordance with commands received by the primary NVMe-oF SSD from the host, wherein the Map Allocation Table indicates a logical block address (LBA) space divided among the primary NVMe-oF SSD and one or more of the secondary NVMe-oF SSDs of the aggregation group.

According to some example embodiments, the method further includes initializing a Map Allocation Table with a processor to configure the aggregation group in accordance with assigning one of the NVMe-oF SSDs as the primary NVMe-oF SSD.

According to some example embodiments, the method further includes aggregating capacities of the secondary NVMe-oF SSDs with the primary NVMe-oF SSD in accordance with a command received by the primary NVMe-oF SSD from the host such that the plurality of NVMe-oF SSDs of the aggregation group appear to the host as a single, aggregated logical capacity.

According to some example embodiments, the method further includes: using the primary NVMe-oF SSD to allocate capacity to one or more of the secondary NVMe-oF SSDs; and using the primary NVMe-oF SSD to record the allocated capacity and associated mapped logical block address (LBA) ranges in a Map Allocation Table.

According to some example embodiments, the method further includes overprovisioning aggregated capacity of the secondary NVMe-oF SSDs and the primary NVMe-oF SSD with the primary NVMe-oF SSD.

According to some example embodiments, the method further includes: receiving a command from the host at the primary NVMe-oF SSD; dividing the command into a plurality of sub-commands each corresponding to a respective one of corresponding ones of the secondary NVMe-oF SSDs; and sending the sub-commands from the primary NVMe-oF SSD to the corresponding ones of the secondary NVMe-oF SSDs.

According to some example embodiments, the method further includes directly transferring data from the corresponding ones of the secondary NVMe-oF SSDs to the host based on the respective sub-commands.

According to some example embodiments, the method further includes: receiving the respective sub-commands at the corresponding ones of the secondary NVMe-oF SSDs from the primary NVMe-oF SSD; performing a task corresponding to the respective sub-commands; and sending respective sub-command completion entries from the corresponding ones of the secondary NVMe-oF SSDs to the primary NVMe-oF SSD upon completion of the task.

According to some example embodiments, the method further includes: using the primary NVMe-oF SSD to maintain a sub-command context table; receiving the sub-command completion entries at the primary NVMe-oF SSD from the secondary NVMe-oF SSDs; and tracking execution of the sub-commands with the primary NVMe-oF SSD in accordance with the received sub-command completion entries.

According to some embodiments, there is provided an aggregated Ethernet SSD group including: an Ethernet SSD chassis; an Ethernet switch on the Ethernet SSD chassis for enabling communication with a host driver; a processor coupled to the Ethernet switch; a PCIe switch coupled to the board management controller; a plurality of NVMe-oF SSDs including: a primary NVMe-oF SSD; and a plurality of secondary NVMe-oF SSDs connected to the primary NVMe-oF SSD via a private communication channel comprising the Ethernet switch and the PCIe switch, wherein only the primary NVMe-oF SSD is visible to the host, and wherein the board management controller is configured to initially determine which of the NVMe-oF SSDs comprises the primary NVMe-oF SSD.

Accordingly, because a single primary eSSD performs all of the NVMe-oF protocol processing while tracking completion of all relevant sub-commands by the secondary eSSDs and keeping the secondary eSSDs invisible to the host, the aggregation group of eSSDs is presented as a single, large logical capacity to the host.

BRIEF DESCRIPTION OF THE DRAWINGS

Some embodiments can be understood in more detail from the following description taken in conjunction with the accompanying drawings, in which.

DETAILED DESCRIPTION

Figure 1:
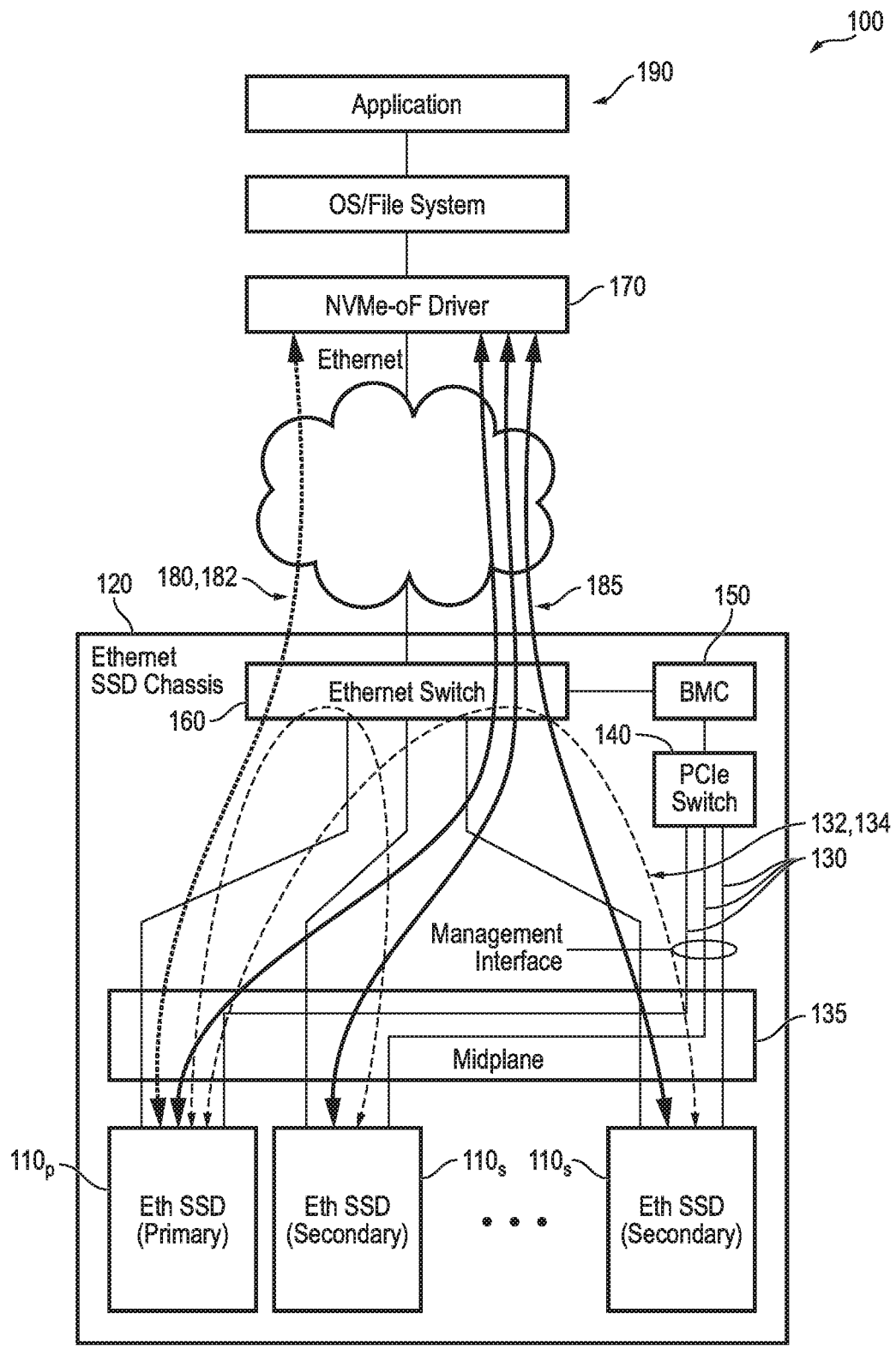
FIG. 1 depicts a block diagram of a system architecture used in NVMe-oF Ethernet SSD (eSSD) storage including multiple aggregated eSSDs in a single eSSD chassis, according to an embodiment of the present disclosure.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

In the following examples, the x-axis, the y-axis and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
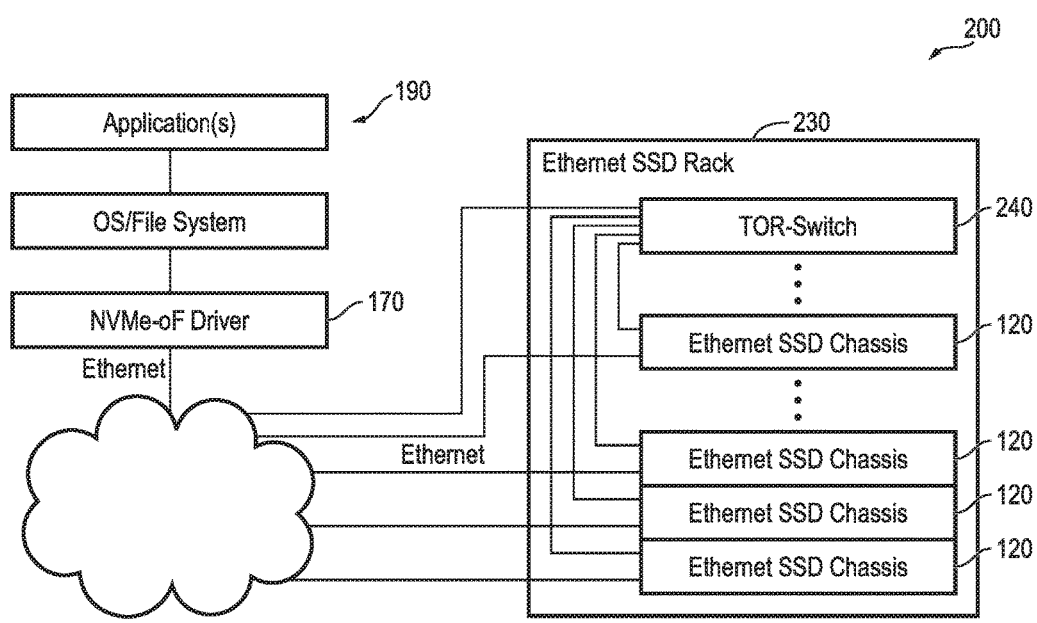
FIG. 2 depicts a block diagram of multiples of the eSSD chassis shown in the embodiment of FIG. 1 connected together in an Ethernet SSD rack, according to an embodiment of the present disclosure.

FIG. 1 depicts a block diagram of a system architecture 100 used in NVMe-oF Ethernet SSD (eSSD) storage including multiple aggregated eSSDs 110 in a single eSSD chassis 120, according to an embodiment of the present disclosure. FIG. 2 depicts a block diagram of multiples of the eSSD chassis 120 such as those shown in the embodiment of FIG. 1 connected together in an Ethernet SSD rack, according to an embodiment of the present disclosure.

As described above, the NVMe-oF interface allows a large number of SSDs 110 to be connected to a remote host 190. Conventionally, for each NVMe-oF SSD 110, a driver instance runs on the remote host 190. However, for some applications, the storage capacity provided by a single SSD 110 is insufficient. Such applications may benefit from a single logical volume having a capacity of hundreds of terabytes. Accordingly, such applications may benefit from embodiments of the present disclosure, which provide a large number of individual SSDs 110 that are aggregated together in an "Aggregation Group," and that are presented as a single logical volume to the application.

For example, 24 16-terabyte (16 TB) eSSDs can be presented as a single, logical 384 TB drive. Some examples of applications needing a large number of aggregated SSDs 110 include big data-mining and analytics, petro-chemicals, gas and energy explorations, experimental particle physics, and pharmaceutical drug development. These examples may require High Performance Computing (HPC), which needs both large storage capacities and high performance.

Although it is possible to have a system software layer that aggregates underlying SSDs 110, and that provides a single logical, expansive volume, such system software is generally highly complex and sophisticated. Such software may require a large number of NVMe-oF driver instances running on the host 190, thereby consuming system resources such as memory, CPU cycles, and power. Target side solutions could potentially use either x86 servers or RAID-on-Chip (ROC) systems to provide a large capacity as single logical volume. However, such solutions are generally complex, expensive, and have performance and energy penalties. For example, receiving and transmitting data by using a CPU may consume an amount of energy that is several times larger than energy consumed by a DMA engine, an ASIC, etc. according to embodiments of the present invention.

Accordingly, embodiments of the present disclosure provide a method and structure for use in Ethernet NVMe-oF SSDs for aggregating multiple eSSDs 110 in an efficient and cost-effective manner.

Referring to FIG. 1, the eSSDs 110 are assigned one of two roles (e.g., at the direction of a storage administrator), such that each eSSD 110 acts as either a primary eSSD (P-eSSD) 110p or a secondary eSSD (S-eSSD) 110s. A single P-eSSD 110p and a set of multiple S-eSSDs 110s in a single chassis 120 (or in multiple chassis 120 in a given rack, or in multiple chassis 120 in multiple racks 230 that are distributed over a wide area) collectively provide the requisite flash memory capacity used by a remote host 190 as a single logical drive. An eSSD chassis 120 includes the eSSDs 110, along with a processor, such as board management controller (BMC) device 150, and an Ethernet switch 160 for external connectivity. Although the eSSD chassis 120 is used to refer to a group of NVMe-oF devices in the description of the embodiments below, other embodiments of the present invention can be similarly applied to any other plurality of NVMe-oF devices, regardless of a physical housing thereof (e.g., a chassis, a rack, or a container-based housing). Further, although eSSDs 110 are used to describe the NVMe-oF devices of the embodiments described below, other NVMe-oF devices may equally applied to other embodiments of the present invention.

Accordingly, via corresponding Ethernet switches 160, it is possible for the aggregation of eSSDs 110 to span across multiple chassis 120 in a rack 230, as well as to span across multiple racks 230 each including multiple chassis 120.

The P-eSSD 110p is the only eSSD 110 that is visible to the remote host NVMe-oF driver 170, and therefore terminates the NVMe-oF protocol. The P-eSSD 110p presents a single, large, aggregated logical capacity to the host 190 on behalf of itself and all of the remaining S-eSSDs 110s in a same aggregation group. The P-eSSD 110p receives all of the input/output (I/O) commands 180 from the remote host NVMe-oF driver 170, and provides command responses (e.g., completion entries) 182 to the host 190.

The P-eSSD 110p also maintains a Map Allocation Table (MAT) that indicates the logical block address (LBA) space divided among the P-eSSD 110p along with some or all of the S-eSSDs 110s of the same aggregation group of eSSDs 110. When an I/O command 180 is received by the P-eSSD 110p, the P-eSSD 110p first looks up the MAT (e.g., MAT 300 of FIG. 3, described further below) to determine which of the eSSDs 110 (e.g., the P-eSSD 110p, one or more of the S-eSSDs 110s, or a set of both) can satisfy the I/O command 180. In accordance with the MAT, the P-eSSD 110p then sends appropriately modified NVMe-oF I/O sub-commands 132 to the set of appropriate S-eSSDs 110s.

To send the sub-commands 132, the P-eSSD 110p also establishes a private Ethernet-RDMA connection (or a proprietary communication channel) 130 over the PCIe bus 140 and the control plane 135 with each of the S-eSSDs 110s after powering on. This private queue-pair (QP) communication channel 130 is used by the P-eSSD 110p to send I/O commands (e.g., sub-commands 132) to the S-eSSDs 110s, and to receive completion entries 134 from the S-eSSDs 110s. The private communication channel 130 can be Ethernet, and can enable data to be transmitted over the Ethernet switch 160. However, the private communication channel 130 can also be a PCIe-based channel, and can enable data to be transmitted over a PCIe switch. That is, it is possible that all of the eSSDs 110 may use two or more modes of communication to communicate with each other. For example, an Ethernet channel may generally be used for transmission of data, and a PCIe channel may be used for management, while either channel can be used as the private communication channel 130.

The S-eSSDs 110s are normal NVMe-oF SSDs 110 that perform only data transfers to and from the remote host 190 using NVMe-oF protocol. These data transfers are done directly with the remote host 190 using RDMA READ and WRITE services. The S-eSSDs 110s receive commands (e.g., sub-commands 132) from the P-eSSD 110p, but do not receive commands directly from the remote host NVMe-oF driver 170. The S-eSSDs 110s send sub-command completion entries 134 to the P-eSSD 110p, instead of to the remote host 190, to indicate completion of the sub-commands 132.

The P-eSSD 110p handles all of the NVMe-oF protocol termination, handles all of the host command and completion queuing (e.g., Submission Queues/Completion Queues (SQ/CQ)), and is visible to the remote host NVMe-oF driver 170 running on the remote host initiator. When the remote host driver 170 issues an NVMe Admin command 180 or an I/O command 180, the command 180 is issued to the P-eSSD 110p, and all of the Admin commands 180 are executed by the P-eSSD 110p. The I/O commands 180, however, can be spread between multiple eSSDs 110.

The P-eSSD 110p may also perform its own share of data transfers in accordance with the I/O command 180. The P-eSSD 110p then waits for all of the sub-command completion entries 134 to arrive (e.g., from the set of S-eSSDs 110s) on the private communications channel 130 before sending a command completion entry 182, which corresponds to the original command 180, to the remote host 190.

Figures 6, 7:
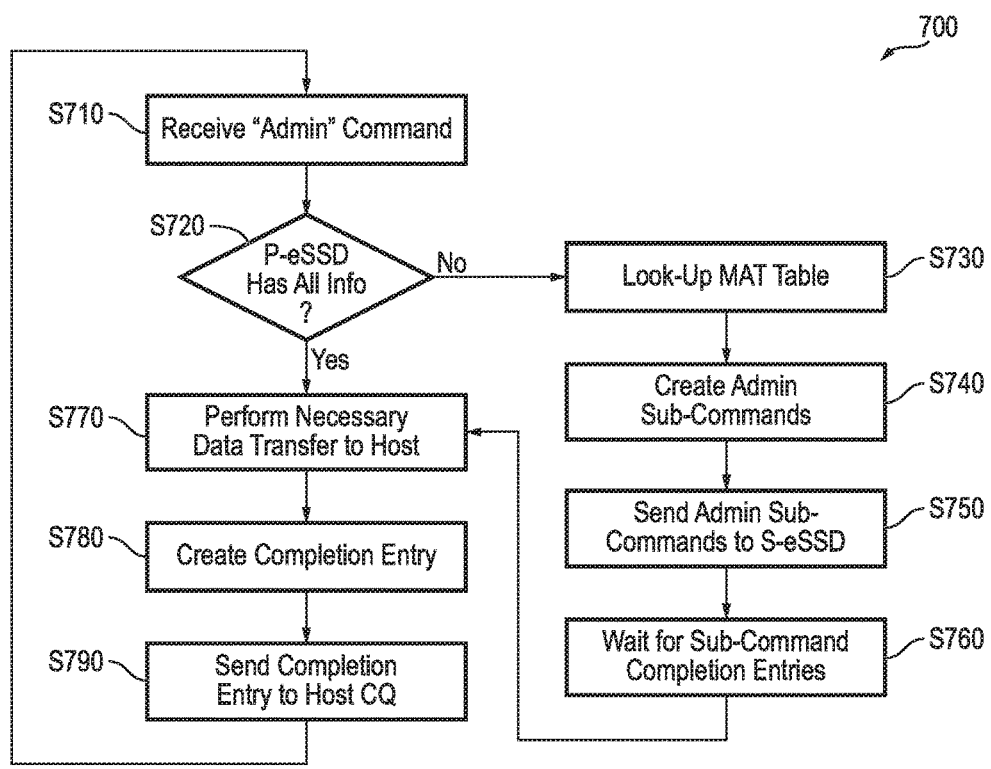
FIG. 6 is a table depicting an example command context.
FIG. 7 depicts a flowchart depicting handling of Admin commands by the primary eSSD, according to an embodiment of the present disclosure.

The P-eSSD 110p also maintains a "command context" for each command in execution in a command context table (e.g., see FIG. 6). This command context is used by the P-eSSD 110p to track the execution of the sub-commands 132, data transfers, and any error status. When all of the sub-commands 132 are done, a command response/completion entry 182 is provided to the remote host 190, and the command context table is deallocated.

Referring to FIG. 2, multiple eSSD chassis 120 may be connected together in an Ethernet SSD rack 230, wherein a Top-Of-Rack (TOR) switch 240 is used to provide connectivity between the multiple chassis 120 in a common rack 230. Similarly, multiple racks 230 that are located at different respective geographical locations can be connected to each other through respective TOR switches 240, which are either directly connected to each other, or connected to each other through external switches. The Ethernet racks 230 can be within a single datacenter building, or can be distributed across a wide geographical area.

To summarize, embodiments of the present disclosure provide a mechanism for aggregating multiple Ethernet NVMe-oF SSDs (eSSDs) 110 to be presented as a single, large capacity NVMe-oF SSD. The eSSDs 110 can be located in a single chassis 120, can be located in multiple chassis 120 in a single rack 230, or can even be scattered across a large number of Ethernet racks 230 each having multiple chassis 120. One of the eSSDs 110 is assigned the role of a primary eSSD (P-eSSD) 110p. The other eSSDs 110 are assigned the role of a secondary eSSD 110s (S-eSSD). The S-eSSDs 110s receive sub-commands 132 from the P-eSSD 110p, complete the sub-commands 132, and send completion entries 134 for those sub-commands 132 back to the P-eSSD 110p, although the S-eSSDs 110s perform direct data transfers with the remote host initiator. Accordingly, the present embodiment allows aggregation of capacities to effectively act as a single Ethernet SSD without sacrificing any storage bandwidth.

Figures 3, 4:
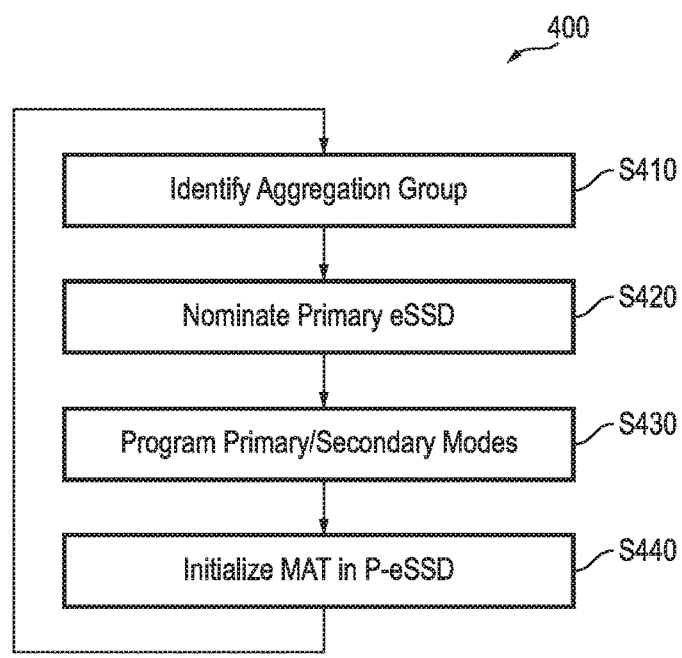
FIG. 3 is an example of a "Map Allocation Table" maintained by a primary eSSD, according to an embodiment of the present disclosure.
FIG. 4 depicts a flowchart depicting initialization of the Map Allocation Table, according to an embodiment of the present embodiment.

FIG. 3 is an example of a "Map Allocation Table" 300 maintained by a P-eSSD 110p, according to an embodiment of the present disclosure. FIG. 4 depicts a flowchart 400 depicting initialization of the Map Allocation Table 300, according to an embodiment of the present embodiment.

Referring to FIGS. 3 and 4, as described above, the present embodiment utilizes two types of eSSDs 110 (e.g., the P-eSSD 110p and the S-eSSDs 110s). Both P-eSSD 110p and S-eSSD 110s use NVMe over Fabrics protocol to provide storage service to the host 190. The P-eSSD 110p maintains a table (e.g., the Map Allocation Table (MAT) 300) containing details of the S-eSSDs 110s in the Aggregation Group of eSSDs 110, which are perceived by the host 190 as a single logical volume.

The MAT 300 may be initialized by the BMC 150 in the same chassis 120 as the P-eSSD 110p. The BMC 150 may manage the Ethernet chassis 120 and the components like the Ethernet switch 160 and the eSSDs 110. The BMC 150 has PCIe and SMBus interfaces for system management purposes. Also, the BMC will determine which eSSDs 110 will be aggregated (S410) (e.g., under the direction of the storage administrator), and when the eSSDs 110 are determined, the BMC 150 may configure the Ethernet switch 160.

The three columns on the left side of the MAT 300 are initialized by the BMC 150 under guidance of a storage administrator. The BMC 150 and the storage administrator are visible to, and have knowledge of, all of the eSSDs 110 present in the Aggregation Group/storage system. Such knowledge includes capacities 311 and address locations 312 of each of the eSSDs 110. The storage administrator may decide which S-eSSDs 110s are needed to form an "Aggregated Ethernet SSD" (e.g., the Aggregation Group). The BMC 150 and the storage administrator may advertise, or provide, the network address of the P-eSSD 110p to the users so that a user application corresponding to the remote host NVMe-oF driver 170 knows where to find the Aggregated Ethernet SSD. The BMC 150 and the storage administrator may also select or nominate one of the eSSDs 110 as the P-eSSD 110p (S420), and may also change the eSSD 110 that is designated as the P-eSSDs 110p for one or more of a variety of reasons after the initial designation. Thereafter, the BMC 150 may program primary and secondary modes of the Aggregation Group (S430).

The P-eSSD 110p may also keep a copy of the MAT 300 on the BMC 150, and may regularly update the copy of the MAT 300 stored with the BMC 150. In some embodiments, only the P-eSSD 110p contains the official MAT 300, and an eSSD index 313 of "0" denotes the P-eSSD 110p, with the remaining eSSD index values corresponding to respective ones of the S-eSSDs 110s.

The P-eSSD 110p terminates the NVMe-oF protocol for the host driver 170, and executes all of the commands 180 issued by the host driver 170. When the host 190 commands 180 are complete, the P-eSSD 110p sends the completion entries 182 in the form of "Completion Entries" 182 back to the host 190 driver 170. With respect to the host commands 180, the remote host NVMe-oF driver 170 is completely unaware of the presence of the S-eSSDs 110s. The P-eSSD 110p also maintains the Submission Queues (SQ), and submits the command completions to Completion Queues (CQ).

The three columns on the right of the MAT 300 are updated and maintained by the P-eSSD 110p. When the remote host NVMe-oF driver 170 creates a "Namespace," certain flash capacity is allocated to that Namespace. The Namespace LBA range 314 is mapped to a set of eSSDs 110, and is recorded in the MAT 300 maintained by the P-eSSD 110p. The details of this process will be described with respect to FIG. 8 below.

The P-eSSD 110p may also perform certain initializations. Once the MAT 300 is initialized in the p-eSSD 110p (S440), the P-eSSD 110p is aware of which of the eSSDs 110 are the corresponding S-eSSDs 110s. The P-eSSD 110p then sets up a communication channel 130 with each of the S-eSSDs 110s in the Aggregation Group. The communication channel 130 can be over the Ethernet interface going through the Ethernet switch 160 in the chassis 120, or alternatively can be over a PCIe interface passing through a PCIe switch in the chassis 120. If one of the S-eSSDs 110s is located in different chassis 120 that is located in the same rack 230, the communication channel 130 is established through the TOR switch 240. A communication channel 130 within a given chassis 120 can be over a PCIe bus 140 as well.

Figure 5:
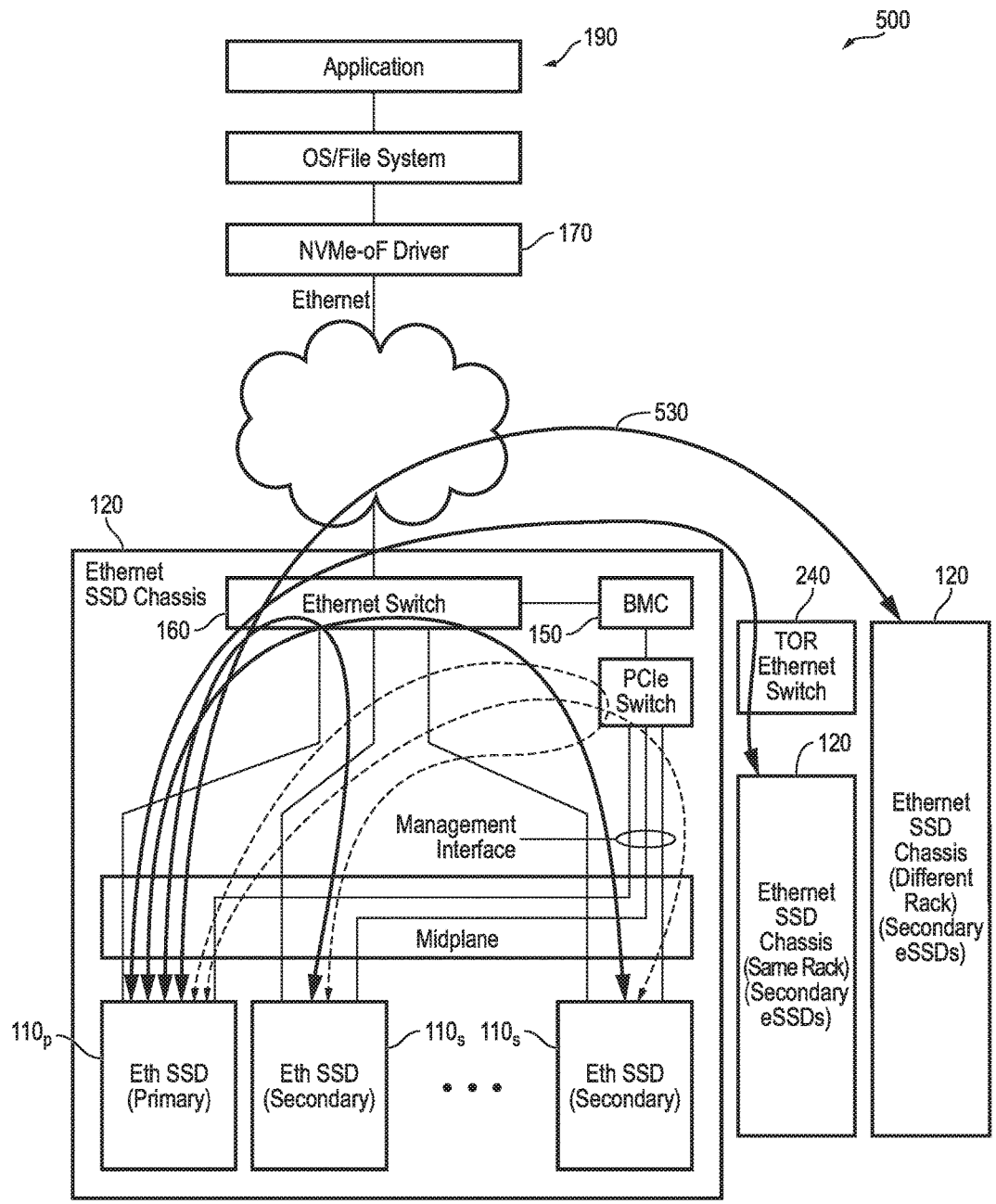
FIG. 5 depicts a block diagram of a system architecture used in NVMe-oF Ethernet SSD (eSSD) storage including data flows to and from multiple aggregated eSSDs in multiple eSSD chassis respectively located in multiple racks, according to an embodiment of the present disclosure.

FIG. 5 depicts a block diagram of a system architecture 500 used in NVMe-oF Ethernet SSD (eSSD) storage including data flows to and from multiple aggregated eSSDs 110 in multiple eSSD chassis 120 respectively located in multiple racks 230, according to an embodiment of the present disclosure.

Referring to FIG. 5, it is possible for the P-eSSD 110p to establish Ethernet communication channels 530 with S-eSSDs 110s located in a wide area network (WAN) through external network switches and routers. Such a private Ethernet communication channel 530 can be RDMA Queue-pair (QP), or can be a proprietary method. The Ethernet communication channel 530 is used to exchange sub-commands 132 and associated completions.

FIG. 6 is a table 600 depicting an example command context.

Referring to FIG. 6, each of the sub-commands 132 have a command ID 640, and carry a "Command Tag," 610 so that when the P-eSSD 110p receives the completion entries 134, the completion entries 134 can be traced back to the original command 180. Upon tracing back the completion entries 134 of the sub-commands 132, a "# of Sub-commands" field 620 is decremented, and a received error status is latched with the current status. When the # of Subcommands field 620 reaches zero, the corresponding command 180 that is the parent of the sub-commands 132 is complete, and the P-eSSD 110p may send a completion 182 back to the remote host 190. The P-eSSD 110p at that point generates a completion entry with accumulated error statuses 630, and puts it in the associated CQ.

FIG. 7 depicts a flowchart 700 depicting handling of Admin commands 180 by the P-SSD 110p, according to an embodiment of the present disclosure.

Referring FIGS. 1 and 7, and as described above, each P-eSSD 110p maintains the command SQs. When there exists commands 180 that are received by the P-eSSD 110P (S710) and that are available for execution, the P-eSSD 110p arbitrates the SQs, and then selects a command 180 for execution. The P-eSSD 110p executes all of the NVMe commands (e.g., Admin commands and I/O commands) 180. That is, although the S-eSSDs 110s may send data directly to the host, the S-eSSDs 110s do not directly receive commands from the host 190, and do not send completions directly to the host 190. The Admin command execution by the P-eSSD 110p may not need any communication with any S-eSSD 110s.

After receiving the command 180, the P-eSSD 110P determines where the data is, and whether it has access to all of the data (S720). If the P-eSSD 110p has all of the data, the P-eSSD 110p transfers the data to the host 190 (S770).

If the P-eSSD 110p determines that it does not have all of the data (S720), the P-eSSD 110p then consults the MAT 300 to determine where the requested data is located (S730). Once the set of relevant eSSDs 110 is identified, the P-eSSD 110p proceeds with the execution of that command 180. When all of the relevant requested data is available in the P-eSSD 110p itself, the P-eSSD 110p performs the data transfer 185. However, when the requested data is scattered over a set of P-eSSD 110p and/or S-eSSDs 110s, the P-eSSD 110p divides the original command 180 into an appropriate number of sub-commands 132 (S740). The number of sub-commands 132 corresponds to the number of the eSSDs 110 over which the requested data is scattered. Each sub-command 132 corresponds to the portion of the requested data that each eSSD 110 possesses.

The P-eSSD 110p puts appropriate Start LBA (SLBA), Number of Blocks (NLB), and remote Scatter/Gather Lists (SGLs) in the sub-commands 132. The SGL contains address, key, and size of the transfer buffer on the remote host 190. The P-eSSD 110p then sends those sub-commands 132 to the respective S-eSSDs 110s (S750) over the private QP communication channels 130 in a command segmentation process, and waits to receive completion entries 134 from each of the respective S-eSSDs 110s (S760). Accordingly, the original command 180 is segmented into sub-commands 132 so that appropriate eSSDs 110 can perform data transfers in parallel, thereby enabling the data to be transferred to the host (S770).

The P-eSSD 110p creates a command context for the commands 180 in execution, which is described with respect to FIG. 6. The command context is used to keep track of the execution of the sub-commands 132, as well as any intermediate error status of the sub-commands 132 (S780). Once the P-eSSD 110p confirms that the Admin command is complete, the P-eSSD 110p sends a completion entry to the host (S790).

Accordingly, all of the Admin commands 180 issued by the remote host NVMe-oF driver 170 are received (S710) and executed by P-eSSD 110p. The P-eSSD 110p may possibly complete many or all of the Admin commands 180 alone (e.g., when the P-eSSD 110p determines in (S720) that it, alone, has all of the information necessary to complete the Admin commands). In some cases the P-eSSD 110p may fetch certain pieces of information from the S-eSSDs 110s before completing an Admin command 180. If the P-eSSD 110p seeks certain non-user data information from the S-eSSDs 110s, the P-eSSD 110p can create and send Admin sub-commands 132 to the respective S-eSSDs 110s. The S-eSSDs 110s can send back any necessary data and sub-command completion entries 134 to the P-eSSD 110p using the private communications channel 130 between them.

Figure 8:
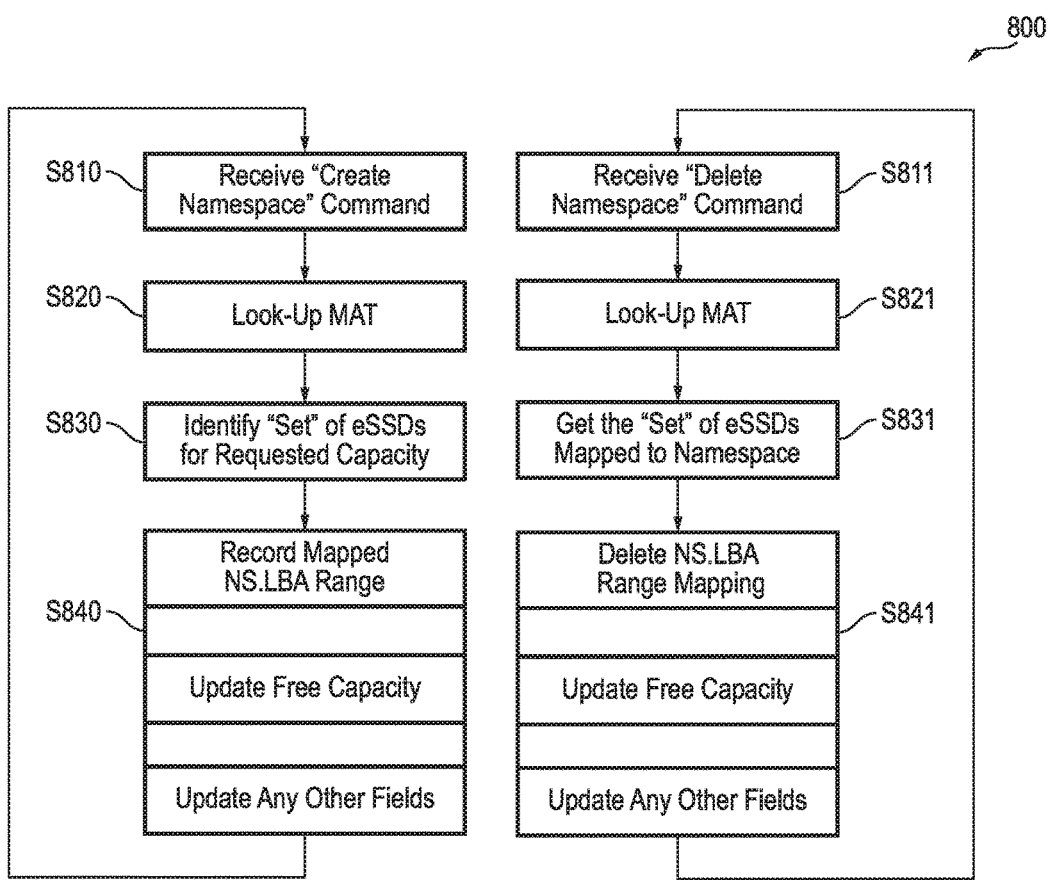
FIG. 8 depicts a flowchart depicting the execution of Namespace Create and Delete commands, according to an embodiment of the present disclosure.

FIG. 8 depicts a flowchart 800 depicting the execution of Namespace Create and Delete commands, according to an embodiment of the present disclosure.

Referring to FIG. 8, the P-eSSD 110p may receive and execute Namespace Create commands (S810) and/or Delete Admin commands (S811). When the P-eSSD 110p receives a Namespace Create command (S810), the P-eSSD 110p may look up the MAT 300 (S820), and may allocate an appropriate amount of capacity from the total available pool (S830). A newly created Namespace may have flash capacity solely from the P-eSSD 110p, or solely from certain ones of the S-eSSD(s), or the newly created Namespace may have the flash capacity from any combination of P-eSSD 110p and S-eSSDs 110s. The P-eSSD 110p may then record the allocated capacity and associated mapped LBA ranges in the MAT 300 (S840).

When the P-eSSD 110p receives a Namespace Delete command (S811) for deleting a Namespace, the P-eSSD 110p looks up the MAT 300 (S821), retrieves the corresponding eSSDs (S831), and deallocates the associated capacity (S841), thereafter updating the MAT 300 accordingly.

With respect to Namespace Create/Delete command execution by the S-eSSDs 110s, the S-eSSDs 110s do not receive Namespace create/delete commands directly. Normally, the S-eSSDs 110s would contain a single Namespace representing the entire capacity. When appropriate, the P-eSSD 110p may issue a Namespace Create command or a Delete command to the S-eSSDs 110s as sub-commands 132. The S-eSSDs 110s then respectively execute those commands, and send a corresponding completion entry 134 back to the P-eSSD 110p. This flow is the same as for any such Admin sub-command it may receive from P-eSSD 110p.

Figure 9:
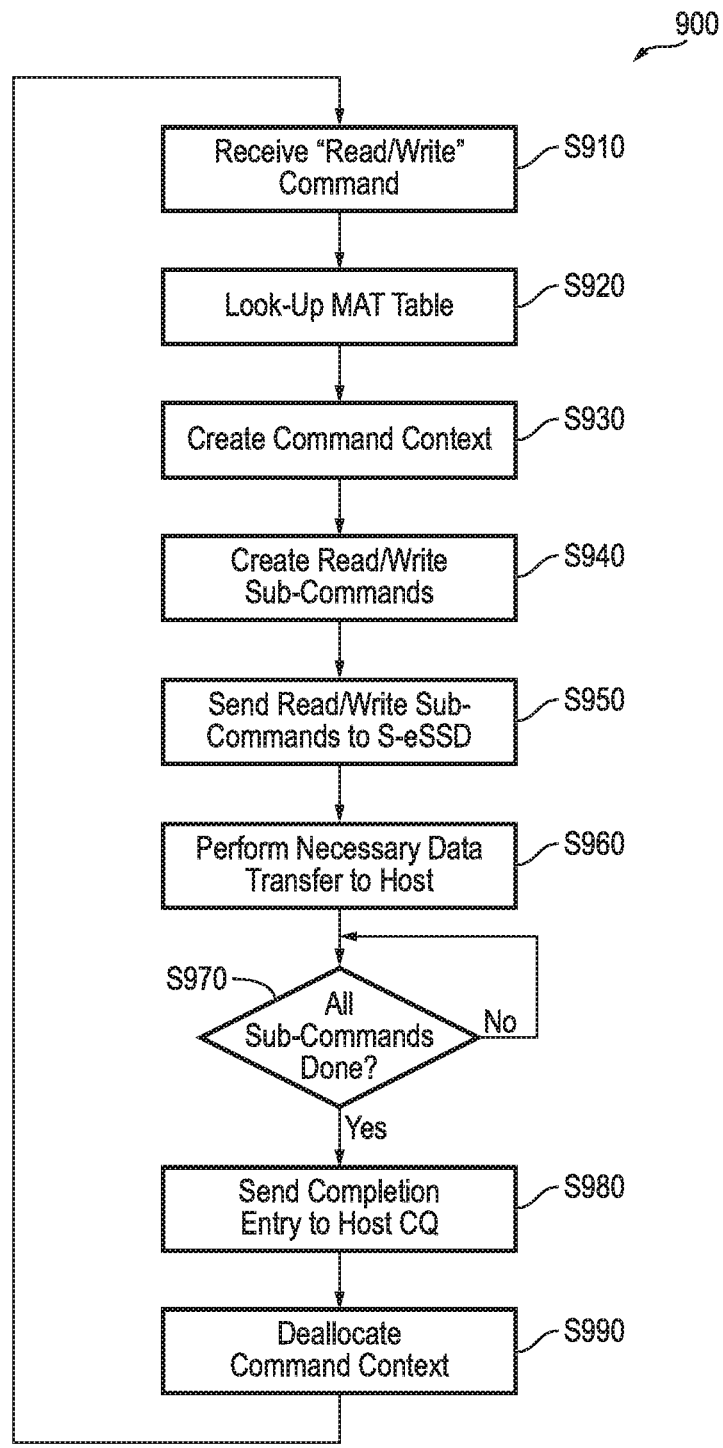
FIG. 9, depicts a flowchart depicting the execution of a Read/Write command under control of the P-eSSD, according to an embodiment of the present disclosure.

FIG. 9 depicts a flowchart 900 depicting the execution of a Read/Write command under control of the P-eSSD 110p, according to an embodiment of the present disclosure.

Referring to FIG. 9, the P-eSSD 110p may receive and execute all of the I/O commands 180, including Read and Write commands 180. When the P-eSSD 110p receives a Read/Write command 180 (S910), the P-eSSD 110p first looks up the MAT 300 (S920). From the MAT 300, the P-eSSD 110p identifies the set of eSSDs where associated user data is located.

As described with respect to FIG. 6, the P-eSSD 110p then creates a command context for the original command (S930) so that the P-eSSD 110p can track execution of the sub-commands 132. The P-eSSD 110p then creates the corresponding Read/Write sub-commands 132 (S940), and sends appropriate sub-commands 132 to the appropriate S-eSSDs 110s (S950). The P-eSSD 110p also provides all of the necessary transport network related information (e.g., addresses) to the S-eSSDs 110s. As part of the sub-commands 132, the S-eSSDs 110s receive remote host 190 SGLs that contain remote buffer address, size, and security key.

The data transfer fields in the sub-commands 132 are appropriately modified to the right offsets. The S-eSSDs 110s perform direct data transfers to the remote host 190 buffers (S960), and when complete, the S-eSSDs 110s send the completions to the P-eSSD 110p (as opposed to directly to the host 190). If necessary, the P-eSSD 110p performs its own share of data transfer to the remote host 190 (S960).

Furthermore, each of the S-eSSDs 110s receives sufficient information from the P-eSSD 110p to perform any direct data transfers to the remote host 190 (S960). In the NVMe-oF protocol, RDMA transport services (RDMA Read and RDMA Write) are used for the data transfers from the S-eSSDs 110s to the remote host 190. The remote host 190 may need to support the Shared Receive Queue (SRQ) feature of RDMA protocol to allow multiple S-eSSDs 110s to transfer data to the remote host 190 (S960). RDMA protocol may run over Ethernet/IP/TCP (iWARP), Ethernet/InfiniBand (RoCE v1), or Ethernet/IP/UDP (RoCE v2). With respect to communication between the S-eSSDs 110s and the remote host 190, the S-eSSDs 110s strictly perform only data transfers with the remote host 190 (S960). That is, only RDMA-Read and RDMA-Write operations are performed by the S-eSSDs 110s with the remote host 190 (S960). The sub-command completion entries 134 and any non-user data transfers are performed with the P-eSSD 110p using an RDMA Send operation or some other proprietary protocol.

When all of the sub-commands are completed (S970), as indicated when all of the sub-command completion entries are received by the P-eSSD 110p, the P-eSSD 110p creates a completion entry 182 for the original command 180, and sends the completion entry 182 to an appropriate CQ on the host 190 (S980). The P-eSSD 110p then deallocates the command context (S990).

Figure 10:
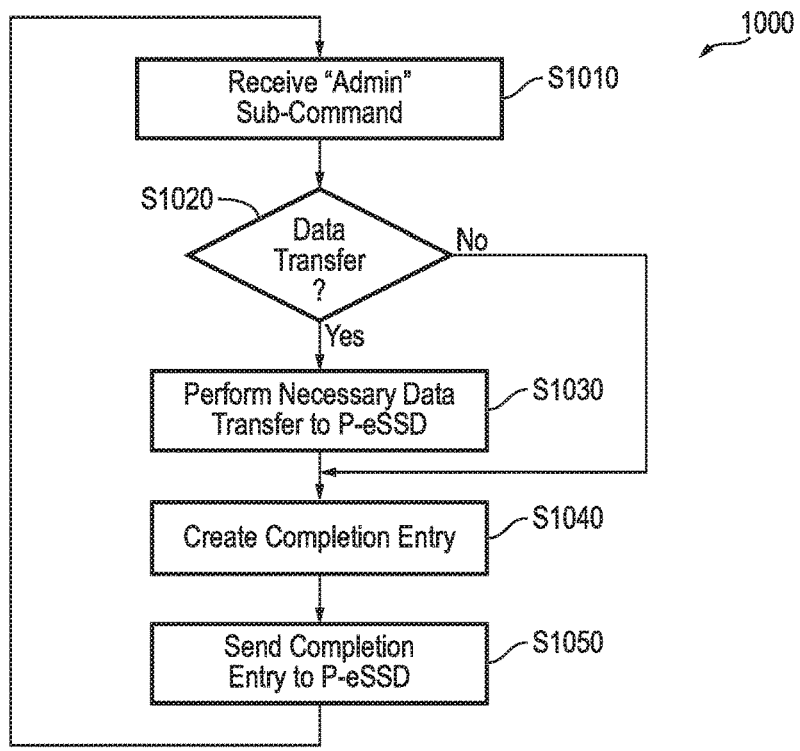
FIG. 10 depicts a flowchart depicting Admin sub-command execution by an S-eSSD, according to an embodiment of the present disclosure.

FIG. 10 depicts a flowchart 1000 depicting Admin sub-command execution by an S-eSSD 110s, according to an embodiment of the present disclosure.

Referring to FIG. 10, in the present embodiment, no S-eSSD 110s ever receives an Admin command 180, or any command, directly from the host 190 NVMe-oF driver 170. Instead, the P-eSSD 110p sends an Admin sub-command 132, only when necessary, to the S-eSSDs 110s (S1010). The S-eSSDs 110s then determines whether any data transfer is needed (S1020), and then perform any data transfers needed with P-eSSD 110p over the private communications channel 130 (S1020). The S-eSSDs 110s then create (S1040) and send a completion entry 134 to the P-eSSD 110p (S1050). In other embodiments, a S-eSSD 110s can use an RDMA Send operation to send data, as well as completion entries 134, to the P-eSSD 110p.

Figure 11:
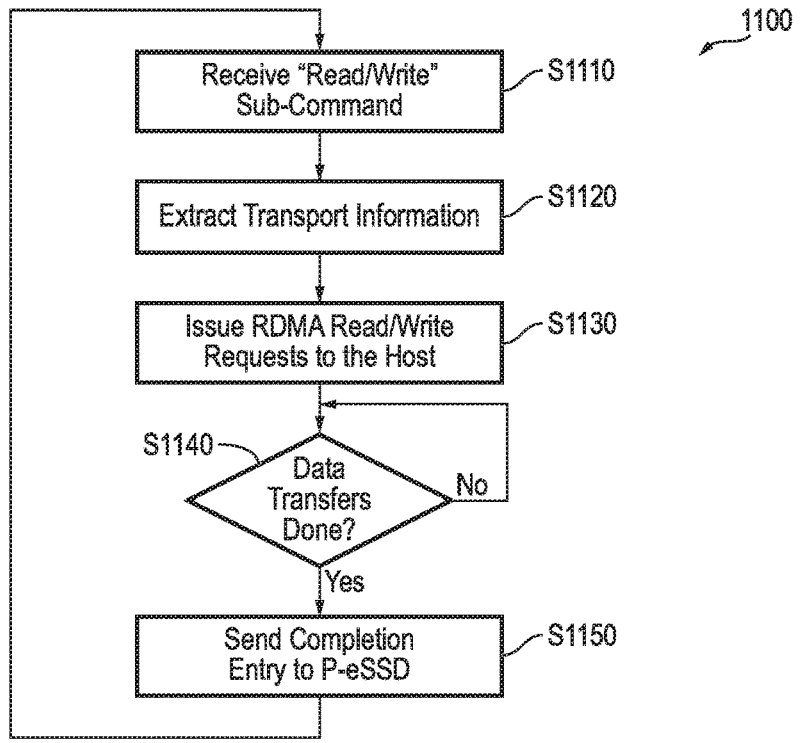
FIG. 11 depicts a flowchart depicting a Read/Write sub-command execution by an S-eSSD, according to an embodiment of the present disclosure.

FIG. 11 depicts a flowchart 1100 depicting a Read/Write sub-command execution by the S-eSSD 110s, according to an embodiment of the present disclosure.

Referring to FIG. 11, the S-eSSDs primarily work on Read or Write sub-commands 132 (e.g., as opposed to Admin sub-commands 132). That is, the S-eSSDs 110s primarily perform data movements to and from remote hosts 190 without getting into other aspects of the protocol processing. When the S-eSSD 110s receives a Read/Write sub-command (S1110), the S-eSSD 110s uses the received transport network information (S1120) to issue RDMA Read or RDMA Write requests to the remote host 190 (S1130). As part of the sub-commands 132, the S-eSSD 110s receives the details of the remote buffer address/offset, size, and security key. When the necessary data transfer is complete (S1140), the S-eSSD 110s sends the completion entry 134 with appropriate error status to the P-eSSD 110p (S1150).

Figure 12:
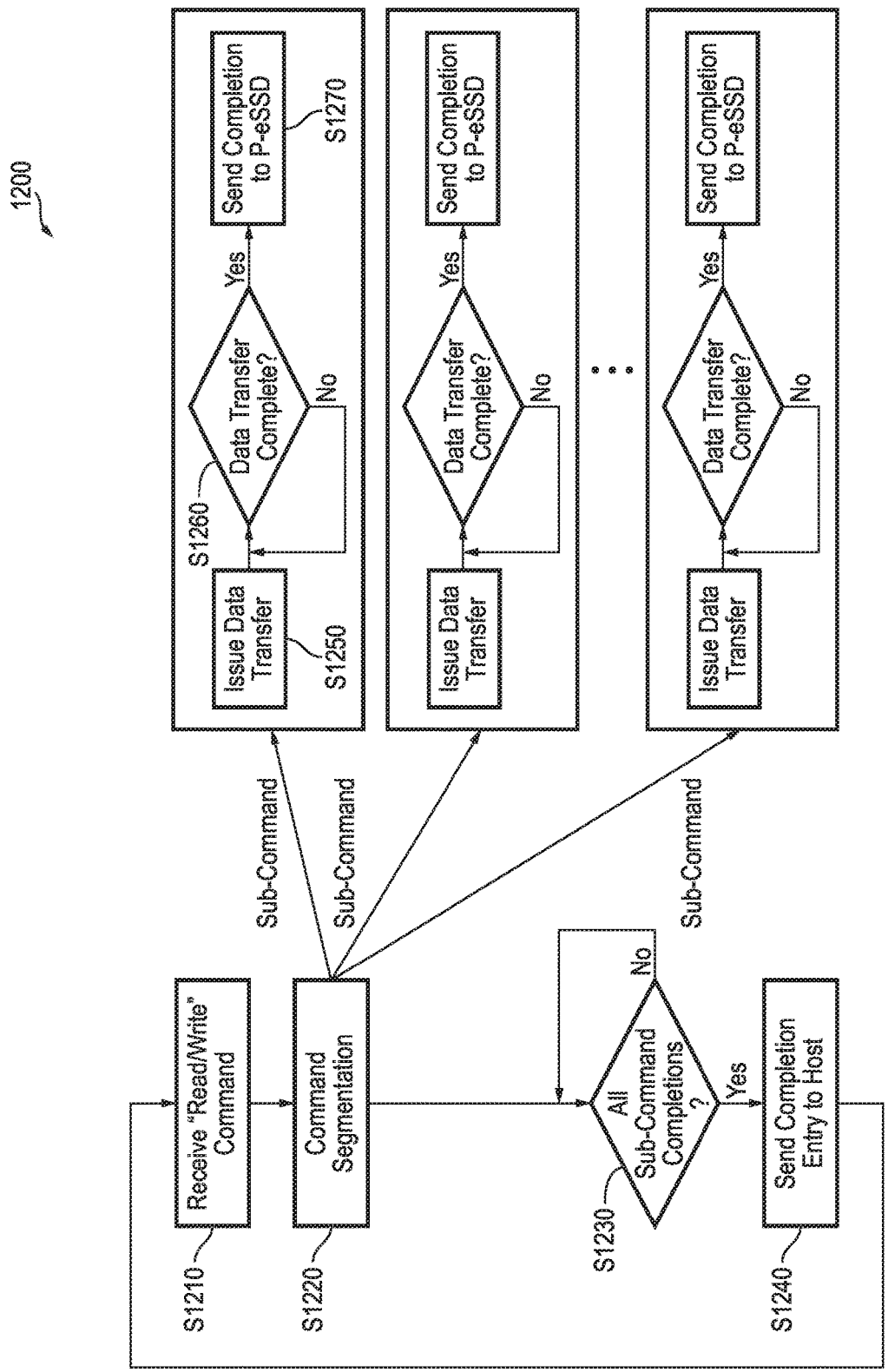
FIG. 12 depicts a flowchart depicting data transfer and sub-command completion synchronization in S-eSSDs, according to an embodiment of the present disclosure.

FIG. 12 depicts a flowchart depicting data transfer and sub-command completion synchronization in S-eSSDs 110S, according to an embodiment of the present disclosure.

Referring to FIG. 12, for a given host command 180, although the P-eSSD 110p sends the completion entry 182 to the host 190, a set of the S-eSSDs 110s may perform data transfers to the host 190. All of the data should be transferred to a remote host 190 before a completion entry 182 for that given command 180 is provided to the host 190, as a completion entry 182 for a command 180 reaching the host 190 before the associated data may result in un-defined behavior/an error.

As described above, the P-eSSD 110p receives a Read/Write command 180 from the host (S1210), and segments the command 180 into a plurality of sub-commands 132 (S1220). Then, each of the S-eSSDs 110s receiving a respective sub-command 132 from the P-eSSD issues a data transfer to the host (S1250), and upon determining that the data transfer is complete (S1260), the S-eSSD 110s sends a completion entry 134 to the P-eSSD 110p (S1270). Then, upon receiving all of the sub-command completion entries 134 from every relevant S-eSSD 110s (S1230), the P-eSSD 110p sends a completion entry 182 to the host (S1240).

Because Aggregated Ethernet SSD data transfers and completion entry posting are distributed over a set of eSSDs 110, data and completion synchronization should be achieved. Usually, when a single eSSD performs both of the phases of a command execution (data transfer+completion posting), such problems may not arise. However, that is not the case with Aggregated Ethernet SSD. Accordingly, the P-eSSD 110p must wait for all of the sub-command completion entries 134 from the respective S-eSSDs 110s before posting a completion entry 182 for a command 180. Further, the S-eSSDs 110s must ensure that all of their data transfers are completely and reliably finished before sending the completion entry 134 of the sub-commands 132 to the P-eSSD 110p. Such two-step synchronization process ensures that the NVMe-oF protocol integrity is achieved in an Aggregated Ethernet SSD system all the time.

According to the above, because only a single primary eSSD is visible to the host, and performs all of the NVMe-oF protocol processing while tracking completion of all relevant sub-commands by the secondary eSSDs, the aggregation group of eSSDs is presented as a single, large logical capacity to the host.

What is claimed is:

1. A method of storage aggregation for NVMe Over Fabrics devices, the method comprising:
   identifying an aggregation group as an aggregated Ethernet SSD comprising a plurality of NVMe-oF SSDs;
   selecting one of the NVMe-oF SSDs of the aggregation group as a primary NVMe-oF SSD;
   selecting others of the NVMe-oF SSDs of the aggregation group as secondary NVMe-oF SSDs; and
   initializing a Map Allocation Table in the primary NVMe-oF SSD with a processor for managing the NVMe-oF SSDs,
   wherein only the primary NVMe-oF SSD is visible to a host, and
   wherein a board management controller is configured to initially determine which of the NVMe-oF SSDs comprises the primary NVMe-oF SSD.

2. The method of claim 1, wherein initializing the Map Allocation Table with the processor occurs under guidance of a storage administrator connected to the aggregation group.

3. The method of claim 1, wherein the Map Allocation Table comprises, for each of the NVMe-oF SSDs of the aggregation group, a capacity of the NVMe-oF SSD, an address of the NVMe-oF SSD, and a remaining amount of capacity of the NVMe-oF SSD.

4. The method of claim 3, the method further comprising providing the address of the primary NVMe-oF SSD to user applications to enable data transfer between the aggregation group and the user applications.

5. The method of claim 1, the method further comprising:
   receiving an Admin command at the primary NVMe-oF SSD from the host connected to the aggregation group;
   determining whether data corresponding to the Admin command is stored on only the primary NVMe-oF SSD or on one or more of the secondary NVMe-oF SSDs;
   when the data is stored on the one or more of the secondary NVMe-oF SSDs, segmenting the Admin command into one or more Admin sub-commands respectively corresponding to the one or more of the secondary NVMe-oF SSDs;
   transferring the data to the host;
   receiving sub-command completion entries from the one or more of the secondary NVMe-oF SSDs; and
   creating and sending a completion entry from the primary NVMe-oF SSD to the host.

6. The method of claim 5, the method further comprising:
   receiving an Admin sub-command of the one or more Admin sub-commands at a corresponding secondary NVMe-oF SSD of the one or more of the secondary NVMe-oF SSDs;
   determining whether to transfer the data from the corresponding secondary NVMe-oF SSD to the primary NVMe-oF SSD in accordance with the Admin sub-command;
   creating a completion entry; and
   sending the completion entry to the primary NVMe-oF SSD.

7. The method of claim 1, the method further comprising:
   receiving a command to create a Namespace or a command to delete a Namespace at the primary NVMe-oF SSD;
   referencing the Map Allocation Table with the primary NVMe-oF SSD;
   allocating capacity in the primary NVMe-oF SSD and/or in one or more of the secondary NVMe-oF SSDs when the command is to create the Namespace, or retrieving a corresponding one of the primary NVMe-oF SSD and/or the one or more of the secondary NVMe-oF SSDs wen the command is to delete the Namespace; and
   updating the Map Allocation Table.

8. The method of claim 1, the method further comprising:
   receiving a Read/Write command at the primary NVMe-oF SSD;
   looking up the Map Allocation Table with the primary NVMe-oF SSD;
   creating one or more Read/Write sub-commands;
   sending the one or more Read/Write sub-commands to one or more of the secondary NVMe-oF SSDs, respectively;

transferring data between the host and the primary NVMe-oF SSD and/or the one or more of the secondary NVMe-oF SSDs in accordance with the Read/Write command; and sending a completion to the host following transfer of the data.

9. The method of claim 8, the method further comprising:

receiving a Read/Write sub-command of the one or more Read/Write sub-commands at a corresponding secondary NVMe-oF SSD of the one or more secondary NVMe-oF SSDs;

extracting transport information corresponding to the Read/Write sub-command;

issuing a Read/Write request from the corresponding secondary NVMe-oF SSD to the host; and sending a completion entry to the primary NVMe-oF SSD following completion of a data transfer corresponding to the Read/Write sub-command.

10. A method of NVMe-oF SSD capacity aggregation in a group of NVMe-oF Ethernet SSDs, the method comprising:

identifying a plurality of NVMe-oF SSDs of an aggregation group;

assigning one of the NVMe-oF SSDs as a primary NVMe-oF SSD; and assigning remaining ones of the NVMe-oF SSDs as secondary NVMe-oF SSDs, wherein the only NVMe-oF SSD that is visible to a host driver of a host is the primary NVMe-oF SSD, wherein only the primary NVMe-oF SSD is visible to the host, and wherein a board management controller is configured to initially determine which of the NVMe-oF SSDs comprises the primary NVMe-oF SSD.

11. The method of claim 10, the method further comprising maintaining a Map Allocation Table with the primary NVMe-oF SSD in accordance with commands received by the primary NVMe-oF SSD from the host, wherein the Map Allocation Table indicates a logical block address (LBA) space divided among the primary NVMe-oF SSD and one or more of the secondary NVMe-oF SSDs of the aggregation group.

12. The method of claim 11, the method further comprising initializing a Map Allocation Table with a processor to configure the aggregation group in accordance with assigning one of the NVMe-oF SSDs as the primary NVMe-oF SSD.

13. The method of claim 10, the method further comprising aggregating capacities of the secondary NVMe-oF SSDs with the primary NVMe-oF SSD in accordance with a command received by the primary NVMe-oF SSD from the host such that the plurality of NVMe-oF SSDs of the aggregation group appear to the host as a single, aggregated logical capacity.

14. The method of claim 10, the method further comprising:

using the primary NVMe-oF SSD to allocate capacity to one or more of the secondary NVMe-oF SSDs; and using the primary NVMe-oF SSD to record the allocated capacity and associated mapped logical block address (LBA) ranges in a Map Allocation Table.

15. The method of claim 10, the method further comprising overprovisioning aggregated capacity of the secondary NVMe-oF SSDs and the primary NVMe-oF SSD with the primary NVMe-oF SSD.

16. The method of claim 10, the method further comprising:

receiving a command from the host at the primary NVMe-oF SSD;

dividing the command into a plurality of sub-commands each corresponding to a respective one of corresponding ones of the secondary NVMe-oF SSDs; and sending the sub-commands from the primary NVMe-oF SSD to the corresponding ones of the secondary NVMe-oF SSDs.

17. The method of claim 16, the method further comprising directly transferring data from the corresponding ones of the secondary NVMe-oF SSDs to the host based on the respective sub-commands.

18. The method of claim 16, the method further comprising:

receiving the respective sub-commands at the corresponding ones of the secondary NVMe-oF SSDs from the primary NVMe-oF SSD;

performing a task corresponding to the respective sub-commands; and sending respective sub-command completion entries from the corresponding ones of the secondary NVMe-oF SSDs to the primary NVMe-oF SSD upon completion of the task.

19. The method of claim 18, the method further comprising:

using the primary NVMe-oF SSD to maintain a sub-command context table;

receiving the sub-command completion entries at the primary NVMe-oF SSD from the secondary NVMe-oF SSDs; and tracking execution of the sub-commands with the primary NVMe-oF SSD in accordance with the received sub-command completion entries.

20. An aggregated Ethernet SSD group comprising:
an Ethernet SSD chassis;
an Ethernet switch on the Ethernet SSD chassis for enabling communication with a host driver of a host;
a processor coupled to the Ethernet switch;
a PCIe switch coupled to a board management controller;
a plurality of NVMe-oF SSDs comprising:
 a primary NVMe-oF SSD; and
 a plurality of secondary NVMe-oF SSDs connected to the primary NVMe-oF SSD via a private communication channel comprising the Ethernet switch and the PCIe switch,
wherein only the primary NVMe-oF SSD is visible to the host, and
wherein the board management controller is configured to initially determine which of the NVMe-oF SSDs comprises the primary NVMe-oF SSD.

* * * * *